United States Patent
Goh et al.

(10) Patent No.: US 8,358,295 B2
(45) Date of Patent: Jan. 22, 2013

(54) VERTICAL ALIGNMENT DISPLAY DEVICE WITH ENHANCED CONTRAST

(75) Inventors: Joon-Chul Goh, Hwaseong-si (KR); Kwang-Chul Jung, Seongnam-si (KR); Chong-Chul Chai, Seoul (KR); Mee-Hye Jung, Suwon-si (KR); Young-Soo Yoon, Suwon-si (KR)

(73) Assignee: Samsung Display Co., Ltd. (KR)

( * ) Notice: Subject to any disclaimer, the term of this patent is extended or adjusted under 35 U.S.C. 154(b) by 609 days.

(21) Appl. No.: 12/559,453

(22) Filed: Sep. 14, 2009

(65) Prior Publication Data

US 2010/0225627 A1  Sep. 9, 2010

(30) Foreign Application Priority Data

Mar. 5, 2009 (KR) .................. 10-2009-0018995

(51) Int. Cl.
*G06F 3/038* (2006.01)
*G09G 5/00* (2006.01)
*G09G 5/10* (2006.01)
*G09G 3/36* (2006.01)

(52) U.S. Cl. .................. 345/205; 345/103; 345/690

(58) Field of Classification Search .................. None
See application file for complete search history.

(56) References Cited

U.S. PATENT DOCUMENTS

| 7,436,461 B2* | 10/2008 | Choi et al. .................. 349/42 |
| 7,944,424 B2* | 5/2011 | Tsao et al. .................. 345/92 |
| 2007/0002253 A1 | 1/2007 | Kim et al. |
| 2007/0018927 A1 | 1/2007 | Kim |

FOREIGN PATENT DOCUMENTS

| JP | 2003-186038 A | 7/2003 |
| JP | 2005-062882 A | 3/2006 |
| JP | 2006-350335 A | 12/2006 |
| JP | 2007-086791 A | 4/2007 |
| JP | 2008-015512 A | 1/2008 |
| KR | 100239336 B1 | 10/1999 |
| KR | 1020050060730 A | 6/2005 |
| KR | 1020060062569 A | 6/2006 |
| KR | 1020070009328 A | 1/2007 |
| KR | 1020070077350 A | 7/2007 |
| KR | 1020080011862 A | 2/2008 |
| KR | 1020080022625 A | 3/2008 |
| KR | 1020080056481 A | 6/2008 |

* cited by examiner

Primary Examiner — Daniell L Negron
(74) Attorney, Agent, or Firm — Innovation Counsel LLP

(57) ABSTRACT

A vertical alignment liquid crystal display includes two sub-pixels each with a variable capacitor. A pixel is bisected into a high gray sub-pixel and a low gray sub-pixel through forming a variable capacitor at each sub-pixel. With this structure, the sub-pixels express different grays so that lateral visibility is enhanced. It is not required in bisecting a pixel into two sub-pixels to form separate wires for applying different signals thereto, and the amount of data to be processed at the driver for driving the display device is reduced. Furthermore, a pixel is bisected into two sub-pixels with variable capacitors in a simplified manner, and it is not required to form additional wires and elements, so the aperture ratio is enhanced.

6 Claims, 11 Drawing Sheets

VERTICAL ALIGNMENT DISPLAY DEVICE WITH ENHANCED CONTRAST

CROSS-REFERENCE TO RELATED APPLICATION

This application claims priority to and the benefit of Korean Patent Application No. 10-2009-0018995 filed in the Korean Intellectual Property Office on Mar. 5, 2009, the entire contents of which are incorporated herein by reference.

BACKGROUND (a) Technical Field

The present invention relates to a liquid crystal display device, and more particularly, to a vertical alignment liquid crystal display.

(b) Description of the Related Art

Liquid crystal displays (LCDs) are now widely used as one of the prominent flat panel displays. A liquid crystal display device has two display panels on which field generating electrodes, such as pixel electrodes and common electrodes, are formed, and a liquid crystal layer is interposed between the panels. In a liquid crystal display device, voltages are applied to the electrodes and an electric field generated across the liquid crystal layer determines the alignment of liquid crystal molecules. By controlling the incident light polarization according to the display data signals a video image is displayed on the LCD panel.

Among the liquid crystal displays, a vertical alignment (VA) mode liquid crystal display has an advantage of a high contrast ratio and a wide reference viewing angle, which is defined as the viewing angle at a contrast ratio of 1:10, also known as the intergray luminance inversion limitation angle. In VA mode liquid crystal display, the axes of the liquid crystal molecules orient perpendicular to the upper and lower display panels when an electric field is not applied thereto.

In the vertical alignment (VA) mode liquid crystal display, cutouts or protrusions may be formed on the field-generating electrodes to widen the viewing angle. The cutouts or protrusions modify the orientation of the liquid crystal molecules nearby, thus widening the reference viewing angle.

However, the lateral visibility of the vertical alignment (VA) mode liquid crystal display is lower than the front visibility. For example, with a patterned vertically aligned (PVA) liquid crystal display with cutouts, the image becomes brighter toward the lateral side, and in a worst case, the luminance difference between the high grays is eradicated so that the picture image may appear to have collapsed.

Information disclosed in the Background section is meant for understanding the invention background and therefore it may contain information that does not form the prior art that is already known to a person of ordinary skill in the art.

SUMMARY

An aspect of the present invention is to provide a vertical alignment liquid crystal display having the advantage of enhanced lateral visibility.

In one or more embodiments of the present invention, a pixel is contains a high gray sub-pixel and a low gray sub-pixel, based on variable capacitors.

An exemplary embodiment of the present invention provides a display device including a plurality of gate lines, a plurality of data lines, and a pixel connected to one of the plurality of gate lines and one of the pluralities of data lines. The pixel includes first and second sub-pixels. The first sub-pixel includes a first thin film transistor having control and input terminals connected to the gate and data lines, respectively, and a first liquid crystal capacitor and a first variable capacitor respectively connected to the output terminal of the first thin film transistor. The second sub-pixel includes a second thin film transistor having control and input terminals connected to the gate and data lines respectively, and a second liquid crystal capacitor and a second variable capacitor respectively connected to the output terminal of the second thin film transistor.

The first and second variable capacitors may have a first capacitance when the voltage applied to the gate electrode reaches or exceeds a predetermined voltage, and they have a second capacitance when the voltage applied to the gate electrode is less than the predetermined voltage.

When one of the first and second variable capacitors has the first capacitance, the other variable capacitor may have the second capacitance.

The first and second variable capacitors may each be formed with a thin film transistor including a gate electrode, a semiconductor layer, a source electrode, and a drain electrode, and the source and drain electrodes may be electrically connected to each other.

The source and drain electrodes of the first variable capacitor may be connected to the output terminal of the first thin film transistor, and the gate electrode of the second variable capacitor may be connected to the output terminal of the second thin film transistor.

The first capacitance may be stored at a region where the semiconductor layer, the source and drain electrodes, and the gate electrode overlap. The second capacitance may be stored at a region where the source and drain electrodes overlap with the gate electrode. An ohmic contact layer may be formed between the source and drain electrodes and the semiconductor layer.

The first capacitance may be stored at a region where the semiconductor layer, the ohmic contact layer, and the source and drain electrodes overlap with the gate electrode. The second capacitance may be stored at a region where the ohmic contact layer and the source and drain electrodes overlap with the gate electrode.

The first and second variable capacitors may each include a gate electrode, a semiconductor layer, and an upper electrode, where the upper electrode may partially overlap with the gate electrode and the semiconductor layer. The upper electrode of the first variable capacitor may be connected to the output terminal of the first thin film transistor, and the gate electrode of the second variable capacitor may be connected to the output terminal of the second thin film transistor.

The first capacitance may be stored at a region where the semiconductor layer and the upper electrode overlap with the gate electrode. The second capacitance may be stored at a region where the upper electrode overlap with the gate electrode. An ohmic contact layer may be formed between the upper electrode and the semiconductor layer.

The first capacitance may be stored at a region where the semiconductor layer, the ohmic contact layer, and the upper electrode overlap with the gate electrode. The second capacitance may be stored at a region where the ohmic contact layer and the upper electrode overlap with the gate electrode.

Another exemplary embodiment of the present invention provides a display device including a plurality of gate lines, a plurality of data lines, and a pixel connected to one of the plurality of gate lines and one of the pluralities of data lines. The pixel includes a thin film transistor with control and input terminals connected to the gate and data lines, respectively, and a liquid crystal capacitor and a variable capacitor respectively connected to the output terminal of the thin film transistor, wherein the variable capacitor is formed with a thin film transistor.

The variable capacitor may have a thin film transistor structure with a gate electrode, a semiconductor layer, a source electrode, and a drain electrode, and the source and drain electrodes may be electrically connected to each other.

The variable capacitor may be formed with a structure where either a source electrode or a drain electrode is removed from a thin film transistor structure of a gate electrode, a semiconductor layer, and source and drain electrodes.

In this way, variable capacitors are formed within each pixel such that the pixel is bisected into a high gray sub-pixel and a low gray sub-pixel. The bisected sub-pixels express different grays so that the lateral visibility is enhanced. It is not needed in bisecting a pixel into two sub-pixels to form separate wires for applying different signals thereto, and the amount of data to be processed at the driver for driving the display device is reduced. Furthermore, a pixel is bisected into two sub-pixels with variable capacitors in a simplified manner, and it is not required to form additional wires and elements, so the aperture ratio is enhanced.

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

A display device according to an exemplary embodiment of the present invention will be first described with reference to FIG. 1.

Figure 1:
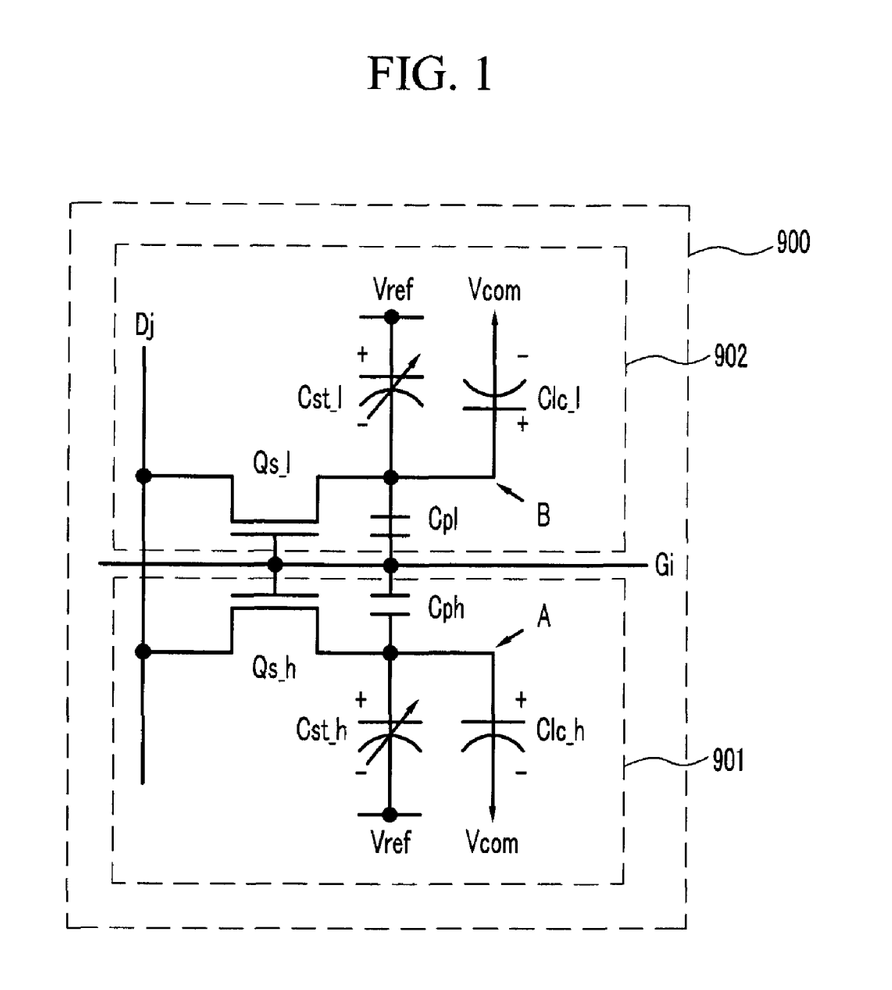
FIG. 1 is an equivalent circuit diagram of a pixel in a liquid crystal display device according to an exemplary embodiment of the present invention.

FIG. 1 is an equivalent circuit diagram of a pixel of a liquid crystal display according to an exemplary embodiment of the present invention.

As shown in FIG. 1, with a liquid crystal display according to an exemplary embodiment of the present invention, a pixel 900 includes two sub-pixels 901 and 902. The sub-pixels 901 and 902 include thin film transistors Qs_h and Qs_l, liquid crystal capacitors Clc_h and Clc_l, and variable capacitors Cst_h and Cst_l, respectively. The sub-pixels 901 and 902 receive the same voltage through a data line Dj, but the voltages applied to the liquid crystal capacitors Clc_h and Clc_l are different depending upon the operation of the variable capacitors Cst_h and Cst_l. As a result, images display different levels of gray by controlling the liquid crystal capacitors Clc_h and Clc_l. The sub-pixel 902 expressing a lower gray will be referred to hereinafter as the low gray sub-pixel, and the sub-pixel 901 expressing a higher gray will be referred to as the high gray sub-pixel.

The relationship of the sub-pixels will be first described in detail.

The high gray sub-pixel 901 includes a thin film transistor Qs_h with a control terminal connected to a gate line Gi and an input terminal connected to the data line Dj. A liquid crystal capacitor Clc_h and a variable capacitor Cst_h are respectively connected to the output terminal of the thin film transistor Qs_h.

The liquid crystal capacitor Clc_h includes a pixel electrode (not shown), a common electrode (not shown), and a liquid crystal layer (not shown) interposed between the pixel and common electrodes. The pixel electrode, which is connected to the output terminal of the thin film transistor Qs_h, receives a data voltage, and the common electrode receives a common voltage Vcom. When an electric field is generated from the voltage difference between the pixel and common electrodes, the liquid crystal molecules reorient to the electric field so that the light polarization is modified quantitatively and an image is displayed.

The variable capacitor Cst_h has its first and second electrodes (not shown) at both ends, and an insulating layer (not shown) disposed between those electrodes. The first electrode, which is connected to the output terminal of the thin film transistor Qs_h, receives a data voltage, and the second electrode receives a reference voltage Vref. The reference voltage Vref may be identical with the common voltage Vcom. The variable capacitor Cst_h according to an exemplary embodiment of the present invention may have polarities, and it may be structured with the high gray sub-pixel 901 that the first electrode connected to the output terminal of the thin film transistor Qs_h has a positive (+) polarity. The variable capacitor Cst_h has the characteristic that the cumulated capacitance rises fast at a predetermined voltage, and reaches its plateau afterwards. This will be described more specifically with reference to FIG. 2.

Meanwhile, a parasitic capacitance Cph is formed between the gate line Gi and the output terminal of the thin film transistor Qs_h.

With the high gray sub-pixel 901, the voltage varies at the output terminal (region A) of the thin film transistor Qs_h due to the characteristic of the variable capacitor Cst_h so that the characteristic of the liquid crystal capacitor Clc_h is altered. At this time, the parasitic capacitance Cph may also be altered, and this will be described later with reference to FIG. 3.

Similarly, the low gray sub-pixel 902 includes a thin film transistor Qs_l with a control terminal connected to the gate line Gi and an input terminal connected to the data line Dj. A liquid crystal capacitor Clc_l and a variable capacitor Cst_l are connected to an output terminal of the thin film transistor Qs_l.

The liquid crystal capacitor Clc_l includes a pixel electrode (not shown), a common electrode (not shown), and a liquid crystal layer (not shown) interposed between those electrodes. The pixel electrode, which is connected to the output terminal of the thin film transistor Qs_l, receives a data voltage, and the common electrode receives a common voltage Vcom. When an electric field is generated from the voltage difference between the pixel and common electrodes, the liquid crystal molecules reorient to the electric field so that the light polarization of light is modified quantitatively and an image is displayed.

The variable capacitor Cst_l has its first and second electrodes (not shown) at both ends, and an insulating layer (not shown) is disposed between those electrodes. The first electrode, which is connected to the output terminal of the thin film transistor Qs_l, receives a data voltage, and the second electrode receives a reference voltage Vref. The reference voltage Vref may be identical with the common voltage Vcom. The variable capacitor Cst_l according to an exemplary embodiment of the present invention may have polarities, and it may be structured with the low gray sub-pixel 902 that the first electrode connected to the output terminal of the thin film transistor Qs_l has a negative (−) polarity. The variable capacitor Cst_l has the characteristic that cumulated capacitance rises fast at a predetermined voltage, and reaches its plateau afterwards. This will be described more specifically with reference to FIG. 2.

Meanwhile, a parasitic capacitance Cpl is formed between the gate line Gi and the output terminal of the thin film transistor Qs_l.

In the low gray sub-pixel 902, the voltage varies at the output terminal (region B) of the thin film transistor Qs_l from the variable capacitor Cst_l so that the capacitance of the liquid crystal capacitor Clc_l varies. At this time, the parasitic capacitance Cpl may also be altered, and this will be described later with reference to FIG. 3.

The operational characteristics of the variable capacitors Cst_h and Cst_l will now be described in detail.

Figure 2:
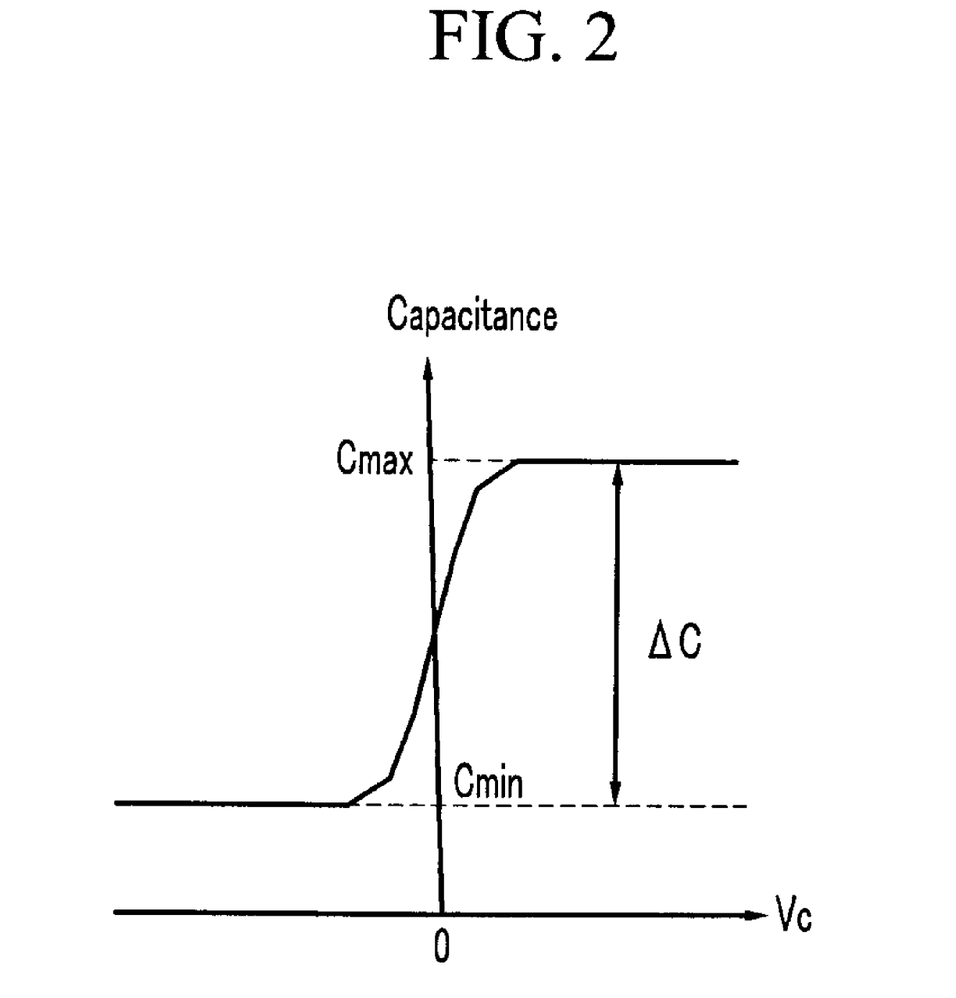
FIG. 2 is a voltage-capacitance graph of the variable capacitors according to an exemplary embodiment of the present invention.

FIG. 2 is a voltage-capacitance graph of the variable capacitors according to an exemplary embodiment of the present invention. In the graph of FIG. 2, the horizontal axis represents voltage applied across each of the variable capacitors Cst_h and Cst_l, and the vertical axis represents the capacitances stored in the variable capacitors Cst_h and Cst_l.

The variable capacitors Cst_h and Cst_l according to an exemplary embodiment of the present invention have the characteristic that the cumulated capacitance quickly rises at a predetermined voltage (indicated in the drawing as 0), and reaches its plateau afterwards. As a result, a difference in capacitance ΔC exists between the minimum capacitance Cmin obtained under the application of the predetermined voltage or less and the maximum capacitance Cmax obtained under the application of more than the predetermined voltage. As the variable capacitors Cst_h and Cst_l have polarities, they exhibit the maximum capacitance Cmax when a voltage equal to or higher than the predetermined voltage is applied to the positive (+) terminal. By contrast, when the voltage is applied to the negative (−) terminal, the variable capacitors Cst_h and Cst_l exhibit the minimum capacitance Cmin because the applied voltage does not influence the capacitance, and the voltage variation over both ends s minimum.

The two sub-pixels 901 and 902 are bisected into the high gray sub-pixel 901 and the low gray sub-pixel 902 due to the difference in capacitance ΔC, and this will now be described in detail with reference to FIG. 3.

Figure 3:
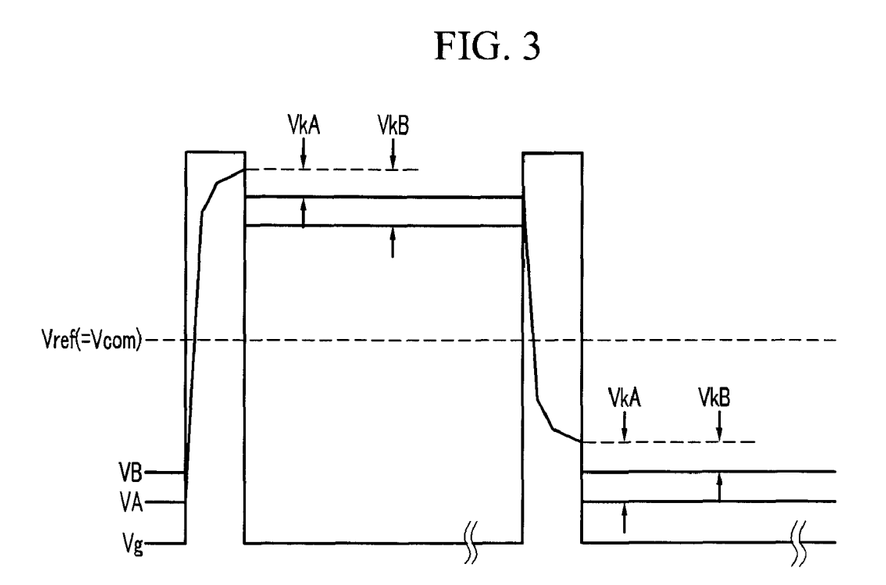
FIG. 3 is a graph illustrating voltage variations at the thin film transistor output terminals a of the two sub-pixels according to an exemplary embodiment of the present invention.

FIG. 3 is a graph illustrating the voltage variation at the output terminal of the thin film transistor in both sub-pixels according to an exemplary embodiment of the present invention.

In the graph of FIG. 3, Vg represents the gate voltage applied to the gate line Gi, VA represents the voltage at the terminal at region A (the A terminal) of the high gray sub-pixel 901 shown in FIG. 1, and VB represents the voltage at the terminal at region B (the B terminal) of the low gray sub-pixel 902. Furthermore, VkA represents the kickback voltage at the A terminal of the high gray sub-pixel 901, and VkB represents the kickback voltage at the B terminal of the low gray sub-pixel 902. The graph of FIG. 3 illustrates the results measured after applying the reference voltage Vref which has the same magnitude as the common voltage Vcom.

When the gate voltage turns on and the data voltage is applied to the pixel, the sub-pixels 901 and 902 are charged with the data voltage. When the gate voltage turns off, the voltage charged at the respective sub-pixels 901 and 902 drops as much as the kickback voltage. The kickback voltage at the A terminal and the kickback voltage at the B terminal are expressed by Equation 1.

$$VkA = \frac{Cp \times \Delta Vgate}{Cmax + Clc + Cp} = \frac{Cp \times \Delta Vgate}{Cmin + \Delta C + Clc + Cp} \quad \text{[Equation 1]}$$

$$VkB = \frac{Cp \times \Delta Vgate}{Cmin + Clc + Cp} = \frac{Cp \times \Delta Vgate}{Cmin + Clc + Cp}$$

In Equation 1, Cp indicates parasitic capacitance, ΔVgate indicates the voltage difference between the on and off sections of the gate voltage, Cmax indicates the maximum capacitance of the variable capacitor, Cmin indicates the minimum capacitance of the variable capacitor, Clc indicates the liquid crystal capacitance, and ΔC indicates the difference between the maximum capacitance Cmax and the minimum capacitance Cmin.

As the kickback voltage at the A terminal has a relatively lower value due to the difference in capacitance ΔC, the voltage of the high gray sub-pixel 901 that drops when the gate voltage turns off is relatively low so that it exhibits a high gray. Equation 1 is valid when the data voltage is higher than the common voltage Vcom.

Meanwhile, a voltage that is lower than the common voltage Vcom is applied as the data voltage by way of inversion driving. The variable capacitor Cst_h of the high gray sub-pixel 901 has the minimum capacitance Cmin because the data voltage is lower than the common voltage Vcom, while the variable capacitor Cst_l of the low gray sub-pixel 902 has the maximum capacitance Cmax. As a result, the kickback voltage at the A terminal is relatively low, and the kickback voltage at the B terminal is relatively high. Therefore, when the gate turns off, the voltage drops much more at the A terminal so that the high gray sub-pixel 901 exhibits a higher gray.

The case where the variable capacitor is formed with a thin film transistor will now be described in detail.

Figure 4:
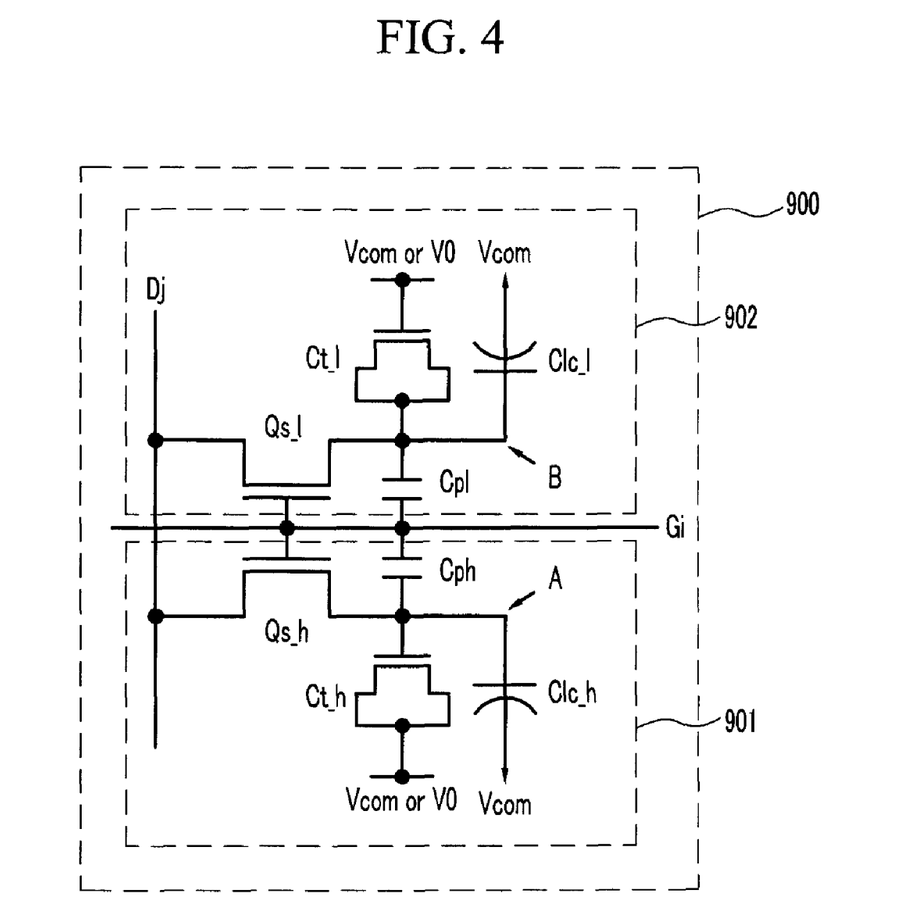
FIG. 4 is an equivalent circuit diagram of a pixel of a liquid crystal display according to an exemplary embodiment of the present invention.
Figure 5:
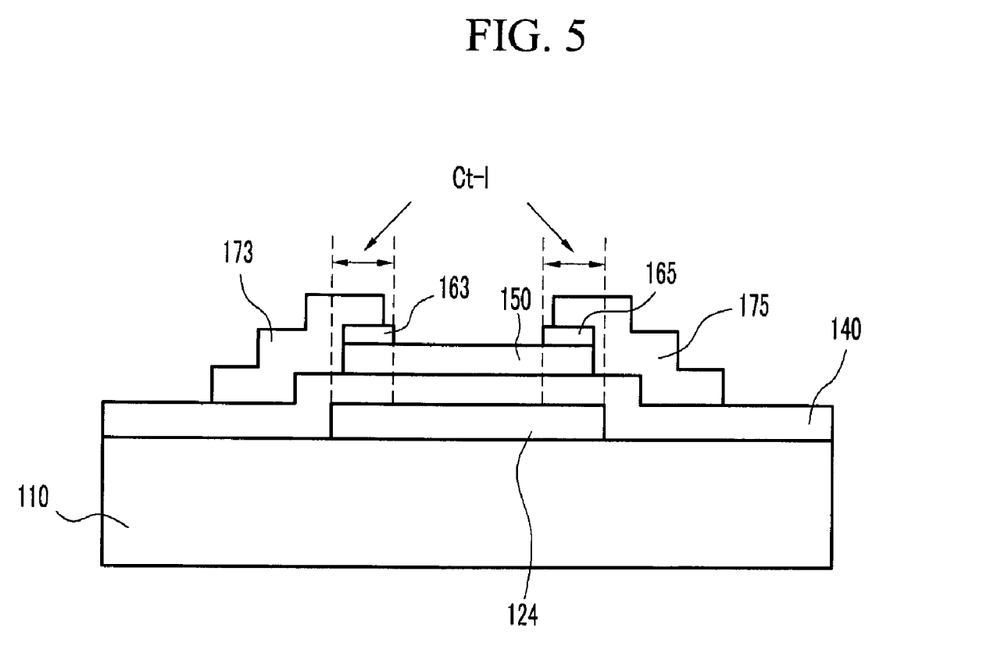
FIG. 5 and FIG. 6 are cross-sectional views of the variable capacitors shown in FIG. 4 according to an exemplary embodiment of the present invention.
Figure 6:
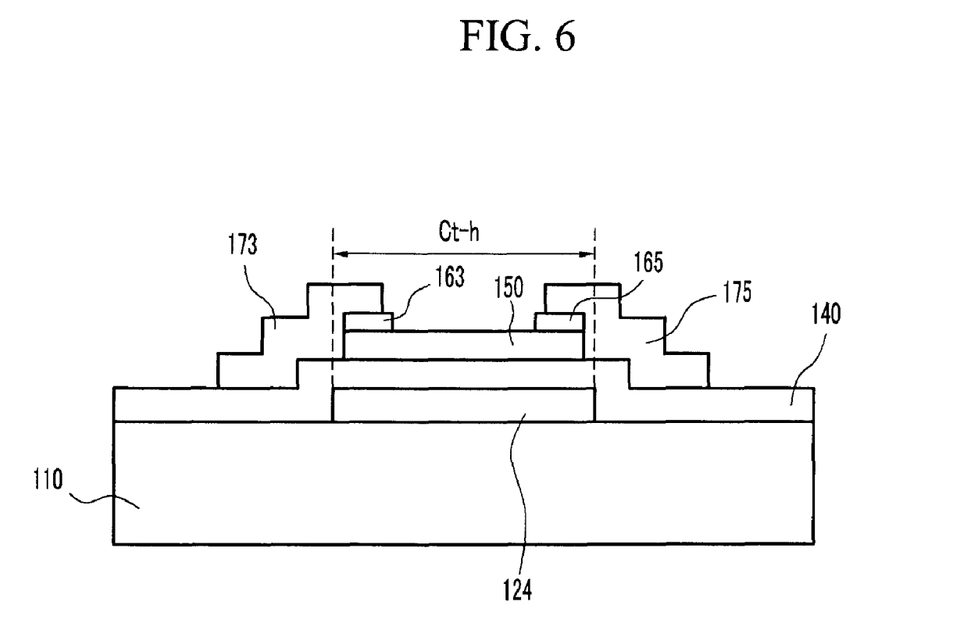
Figure 7:
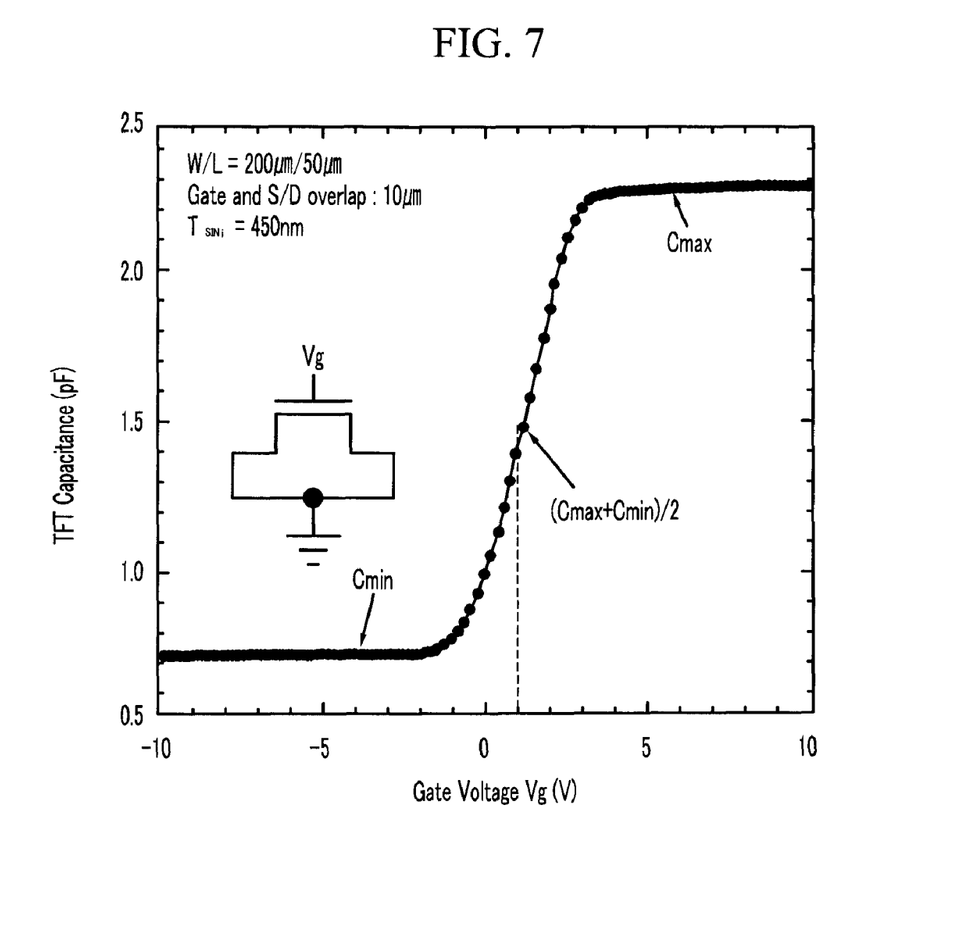
FIG. 7 is a voltage-capacitance graph of the variable capacitors shown in FIG. 6 according to an exemplary embodiment of the present invention.

FIG. 4 is an equivalent circuit diagram of a pixel in a liquid crystal display according to an exemplary embodiment of the present invention, and FIG. 5 and FIG. 6 are cross-sectional views of the variable capacitors shown in FIG. 4. FIG. 7 is a voltage-capacitance graph of the variable capacitors shown in FIG. 6. The numerical reference 110 in the figures represents a substrate.

As shown in FIG. 4, with a liquid crystal display according to an exemplary embodiment of the present invention, pixel 900 includes two sub-pixels 901 and 902. The sub-pixels 901 and 902 include thin film transistors Qs_h and Qs_l, liquid crystal capacitors Clc_h and Clc_l, and variable capacitors Ct_h and Ct_l, respectively. The respective sub-pixels 901 and 902 receive the same voltage through a data line Dj, but the voltages applied to the liquid crystal capacitor Clc_l and Clc_h are different depending upon the operation of the variable capacitors Ct_l and Ct_h. As a result, when images are displayed by way of the liquid crystal capacitors Clc_l and Clc_h, they express different grays. The sub-pixel 902 expressing a relatively lower gray will be referred to as the low gray sub-pixel, and the sub-pixel 901 expressing a relatively higher gray will be referred to as the high gray sub-pixel.

The relationship of the respective sub-pixels will be first described in detail.

The high gray sub-pixel 901 includes a thin film transistor Qs_h with a control terminal connected to a gate line Gi and an input terminal connected to the data line Dj. A liquid crystal capacitor Clc_h and a variable capacitor Cst_h are respectively connected to the output terminal of the thin film transistor Qs_h.

The liquid crystal capacitor Clc_h includes a pixel electrode (not shown), a common electrode (not shown), and a liquid crystal layer (not shown) interposed between the pixel and common electrodes. The pixel electrode, which is connected to the output terminal of the thin film transistor Qs_h, receives a data voltage, and the common electrode receives a common voltage Vcom. When an electric field is generated from the voltage difference between the pixel and common electrodes, the liquid crystal molecules reorient so that the light polarization is modified quantitatively and an image is displayed.

As shown in FIG. 6, the variable capacitor Ct_h is formed with a thin film transistor including a gate electrode 124, a semiconductor layer 150, a source electrode 173, and a drain electrode 175. The source and drain electrodes 173 and 175 are electrically connected to each other. A gate insulating layer 140 is interposed between the semiconductor layer 150 and the gate electrode 124. Ohmic contact layers 163 and 165 are formed between the drain electrode 175 and the semiconductor layer 150 as well as between the source electrode 173 and the semiconductor layer 150. With the high gray sub-pixel 901, the gate electrode 124, which is connected to the output terminal of the thin film transistor Qs_h, receives a data voltage, and the source and drain electrodes 173 and 175 receive a common voltage Vcom. An arbitrary voltage V0 may be applied to the target instead of the common voltage Vcom. It is illustrated with the indication Vcom or V0 in FIG. 4 that either the common voltage Vcom or the arbitrary voltage may be applied to the target. With the variable capacitor Ct_h according to an exemplary embodiment of the present invention, when the voltage applied to the gate electrode 124 reaches or exceeds a predetermined voltage, a channel is formed at the semiconductor layer 150 according to the characteristic of the thin film transistor. In this case, the semiconductor layer 150 functions as a conductor so that a variable capacitor Ct_h is formed at a region of the semiconductor layer 150, the source electrode 173, and the drain electrode 175 overlapped with the gate electrode 124. The operation characteristic of the variable capacitor Ct_h of the high gray sub-pixel 901 will be described more specifically with reference to FIG. 7.

With the graph of FIG. 7, the horizontal axis represents the voltage applied to the gate, and the vertical axis represents the capacitance stored at the thin film transistor. With the thin film transistor shown in FIG. 7, the source and drain electrodes are electrically connected to each other while being grounded. The width W of the thin film transistor in one embodiment, is 200 μm, the length L thereof 50 μm, the length of the gate electrode overlapping with the source and the drain electrodes to be 10 μm, and the thickness of the insulating layer 450 nm.

Experiments that the cumulated capacitance of the thin film transistor quickly rises along a predetermined voltage (indicated by dotted lines in the drawing), and gradually reaches a predetermined capacitance Cmax. Accordingly, when the voltage applied through the gate electrode 124 reaches a predetermined value, the thin film transistor has the maximum capacitance Cmax.

Furthermore, with the high gray sub-pixel 901, a parasitic capacitance Cph is formed between the gate line Gi and the output terminal of the thin film transistor Qs_h.

Similarly, the low gray sub-pixel 902 includes a thin film transistor Qs_l with a control terminal connected to the gate line Gi and an input terminal connected to the data line Dj. A liquid crystal capacitor Clc_l and a variable capacitor Ct_l are connected to the output terminal of the thin film transistor Qs_l.

The liquid crystal capacitor Clc_l includes a pixel electrode (not shown), a common electrode (not shown), and a liquid crystal layer (not shown) interposed between the pixel and common electrodes. The pixel electrode, which is connected to the output terminal of the thin film transistor Qs_l, receives a data voltage, and the common electrode receives a common voltage Vcom. An electric field is generated from the voltage difference between the pixel and common electrodes, and the liquid crystal molecules reorient to modify the light polarization is quantitatively, thus displaying an image.

Similarly, as shown in FIG. 5, the variable capacitor Ct_l is formed with a thin film transistor including gate electrode 124, semiconductor layer 150, source electrode 173, and drain electrode 175. The source and drain electrodes 173 and 175 are electrically connected to each other. The gate insulating layer 140 is interposed between the semiconductor layer 150 and the gate electrode 124. Ohmic contact layers 163 and 165 are formed between the drain electrode 175 and the semiconductor layer 150 as well as between the source electrode 173 and the semiconductor layer 150. With the low gray sub-pixel 902, the source and drain electrodes 173 and 175, which are connected to the output terminal of the thin film transistor Qs_l, receive a data voltage, and the gate electrode 124 receives a common voltage Vcom. An arbitrary voltage V0, instead of the common voltage Vcom, may be applied to the target, and the arbitrary voltage V0 is indicated separately in FIG. 4. However the variable capacitor Ct_l has a characteristic according to an exemplary embodiment of the present invention, when a predetermined voltage is applied to the gate electrode 124 of the thin film transistor, it does not turn on because no channel is formed at the semiconductor layer 150. Consequently, as shown in FIG. 5, a variable capacitor Ct_l is formed where the source and drain electrodes 173 and 175 overlap the gate electrode 124. In case ohmic contact layers 163 and 165 are formed, such a variable capacitor may be formed where the ohmic contact layers 163 and 165 and the source and drain electrodes 173 and 175 overlap the gate electrode 124. In the case of the low gray sub-pixel 902, a constant voltage is applied to the gate electrode 124.

Furthermore, a parasitic capacitance Cph is formed between the gate line Gi and the output terminal of the thin film transistor Qs_l.

As described above, the variable capacitor Ct_l of the low gray sub-pixel 902 shown in FIG. 5 and the variable capacitor Ct_h of the high gray sub-pixel 901 shown in FIG. 6 have different storage capacitance because the overlapping areas differ from each other even though other conditions are the same. Consequently, the kickback voltages are different for the two sub-pixels, even though the same data voltage is applied thereto, resulting in different luminance.

FIG. 4 to FIG. 6 illustrate the structure of the variable capacitor where the source and drain electrodes of the thin film transistor are electrically connected to each other. With the usage of the variable capacitor where the source and drain electrodes of the thin film transistor are electrically connected to each other, the device characteristics are identified so as to test the reliability thereof. This is illustrated in FIG. 8 and FIG. 9.

Figure 8:
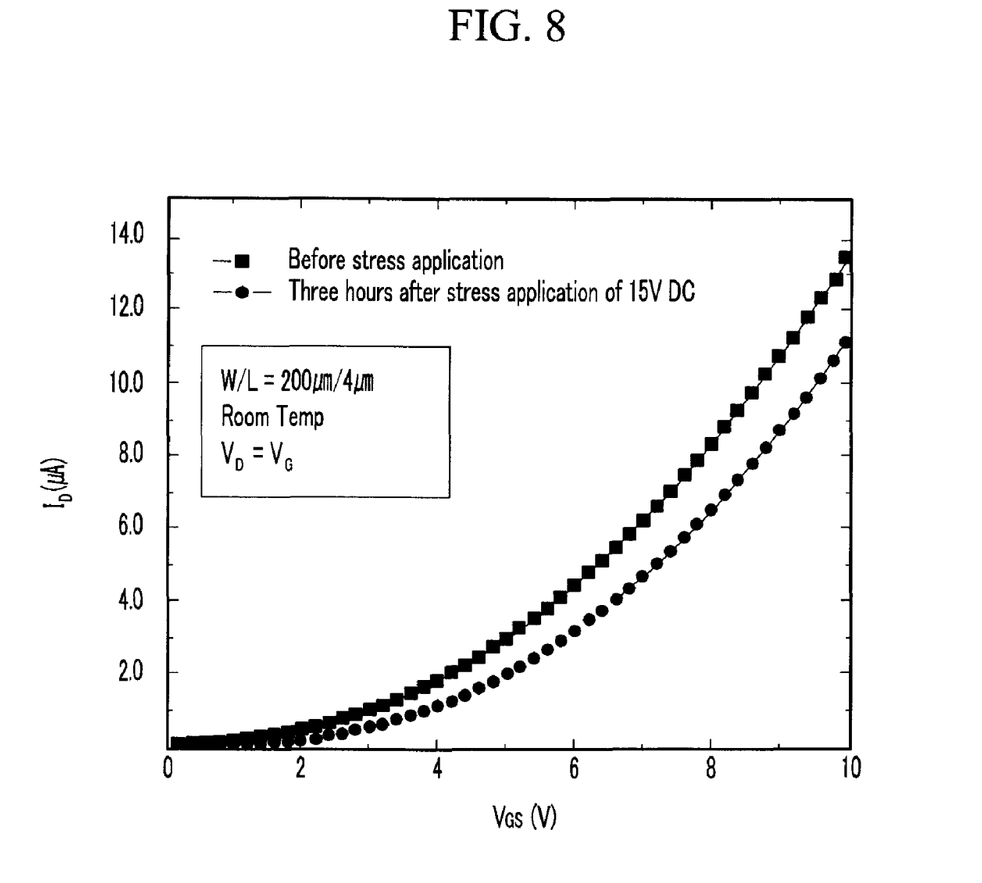
FIG. 8 and FIG. 9 are graphs illustrating the voltage-current characteristics under the stress from the variable capacitors shown in FIG. 4 according to an exemplary embodiment of the present invention.
Figure 9:
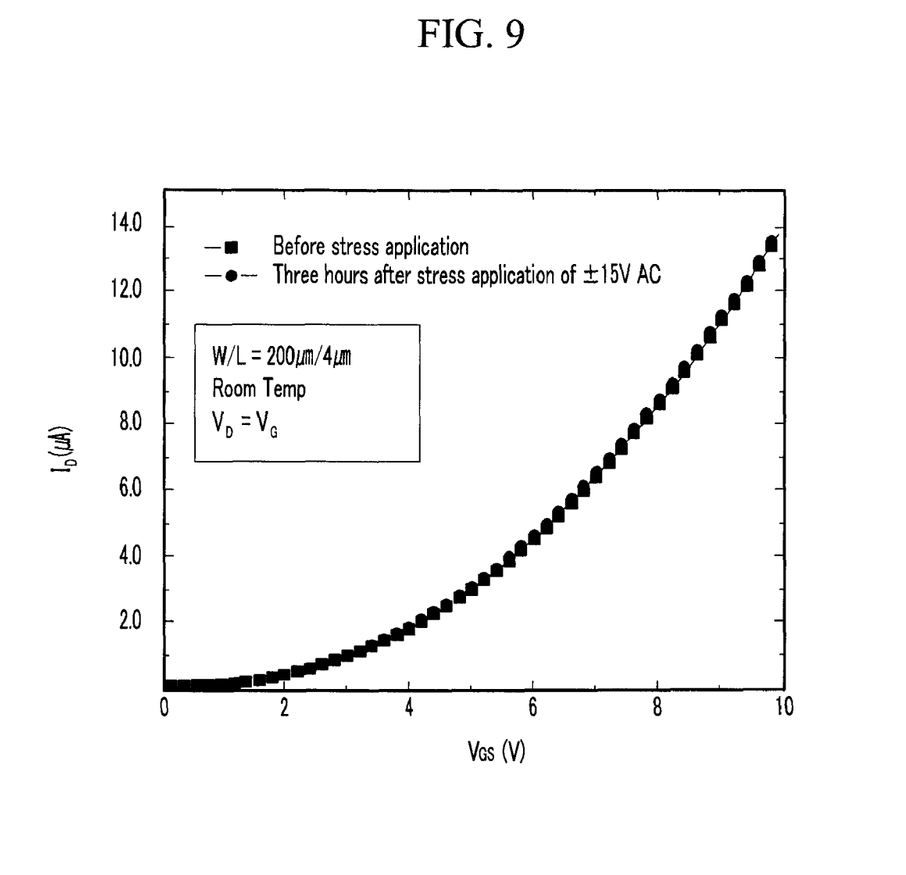

FIG. 8 and FIG. 9 illustrate the voltage-current characteristics under stress of the variable capacitors shown in FIG. 4.

FIG. 8 illustrates the case with DC voltages driving the gate, and FIG. 9 illustrates the case with AC voltages driving the gate. In FIG. 8 and FIG. 9, the horizontal axis represents the voltage difference between the gate and source electrodes, and the vertical axis represents the electric current flowing along the drain electrode.

FIG. 8 shows that the current-voltage curve before the stress application is different from after the stress applied under 15 V DC for three hours.

By contrast, FIG. 9 shows that the voltage-current curve before the AC voltage stress application overlaps the curve after the three hour stress under the ±15V AC voltage.

Because the liquid crystal display is commonly inversion-driven to prevent device degradation, there is no problem in forming and using the variable capacitors shown in FIG. 4 with the inversion-driving.

A variable capacitor according to another exemplary embodiment of the present invention will now be described in detail.

Figure 10:
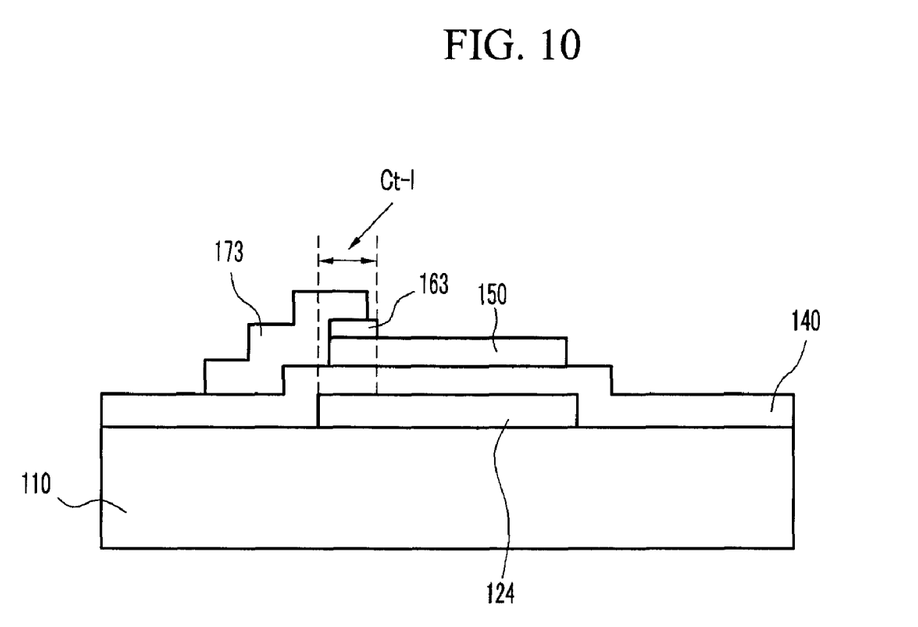
FIG. 10 and FIG. 11 are cross-sectional views of variable capacitors according to another exemplary embodiment of the present invention.
Figure 11:
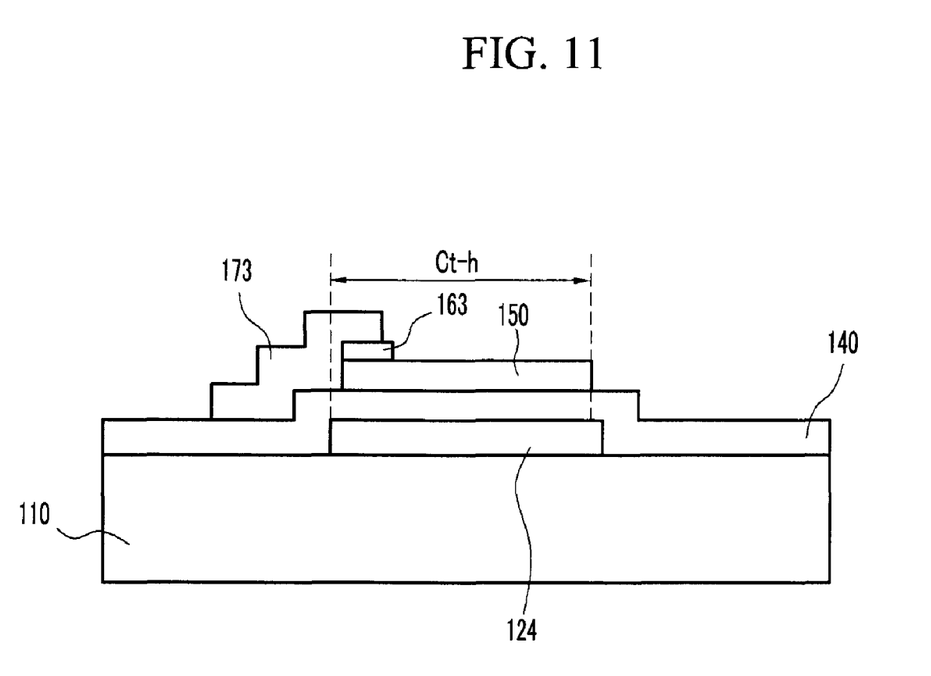

FIG. 10 and FIG. 11 are cross-sectional views of variable capacitors according to another exemplary embodiment of the present invention.

The variable capacitors shown in FIG. 10 and FIG. 11 may include all the other structural features of those shown in FIG. 1. With a liquid crystal display according to an exemplary embodiment of the present invention, pixel 900 includes two sub-pixels 901 and 902, which in turn include thin film transistors Qs_h, Qs_, liquid crystal capacitors Clc_h and Clc_l, and variable capacitors Ct_h and Ct_l, respectively.

The variable capacitor Ct_h of the high gray sub-pixel 901 is illustrated in FIG. 11, and the variable capacitor Ct_l of the low gray sub-pixel 902 is illustrated in FIG. 10.

As shown in FIG. 11, the variable capacitor Ct_h of the high gray sub-pixel 901 includes gate electrode 124, semiconductor layer 150, and source electrode 173, but there is no drain electrode like in a common thin film transistor. The gate insulating layer 140 is formed between the semiconductor layer 150 and the gate electrode 124. Furthermore, an ohmic contact layer 163 is formed between the source electrode 173 and the semiconductor layer 150. In the high gray sub-pixel 901, the gate electrode 124, which is connected to the output terminal of the thin film transistor Qs_h, receives a data voltage, and the source and drain electrodes 173 and 175 receive a common voltage Vcom. An arbitrary voltage V0 may be applied to the target instead of the common voltage Vcom. However in the variable capacitor Ct_h shown in FIG. 11, when the voltage applied to the gate electrode 124 reaches or exceeds a predetermined voltage, the semiconductor layer 150 operates like a conductor according to the characteristic of the thin film transistor. In this case, as shown in FIG. 11, a variable capacitor Ct_h is formed where the semiconductor layer 150 and the source electrode 173 overlap the gate electrode 124.

The low gray sub-pixel 902 includes a variable capacitor Ct_l shown in FIG. 10. The variable capacitor Ct_l of the low gray sub-pixel 902 includes gate electrode 124, semiconductor layer 150, and source electrode 173, but there is no drain electrode like in a common thin film transistor. The gate insulating layer 140 is formed between the semiconductor layer 150 and the gate electrode 124. The ohmic contact layer 163 is formed between the source electrode 173 and the semiconductor layer 150. In the low gray sub-pixel 902, the source electrode 173, which is connected to the output terminal of the thin film transistor Qs_l, receives a data voltage, and the gate electrode 124 receive a common voltage Vcom. An arbitrary voltage V0, instead of a common voltage Vcom, may be applied to the target. In the variable capacitor Ct_l according to an exemplary embodiment of the present invention, a predetermined voltage is applied to the gate electrode 124 according to the characteristic of the thin film transistor, the thin film transistor does not turn on because no channel is formed at the semiconductor layer 150. Consequently, in FIG. 10, a variable capacitor Ct_l is formed where the source electrode 173 overlaps the gate electrode 124. When ohmic contact layer 163 is formed, such a variable capacitor may be formed where the ohmic contact layer 163 and the source electrode 173 overlap the gate electrode 124.

As described above, the variable capacitor Ct_l of the low gray sub-pixel 902 shown in FIG. 10 and the variable capacitor Ct_h of the low gray sub-pixel 901 shown in FIG. 11 have different storage capacitance as the overlapped areas thereof differ from each other even though other conditions are the same. Consequently, the kickback voltages are formed differently at the respective sub-pixels, even though the same data voltage is applied thereto, resulting in different luminance.

The variable capacitance structure shown in FIG. 10 and FIG. 11 differs from that shown in FIG. 5 and FIG. 6 in that the variable capacitors Ct_l and Ct_h in the two sub-pixels 901 and 902 are differently controlled. That is, the variable capacitors Ct_h of the high gray sub-pixels 901 shown in FIG. 6 and FIG. 11 differ little from each other, but the variable capacitors Ct_l of the low gray sub-pixels 902 significantly differ from each other in that the capacitance in FIG. 10 is reduced to half that in FIG. 5 (see the double ended arrows) Therefore, it is possible in the formation of a display device, to use the structure shown in FIG. 10 and FIG. 11 in case it is desirable to enlarge the dimensional difference between the variable capacitors Ct_l and Ct_h of the two sub-pixel 901 and 902, or to use the structure shown in FIG. 5 and FIG. 6 in case it is desirable to reduce the dimensional difference between those variable capacitors Ct_l and Ct_h. Furthermore, it is possible in designing a thin film transistor to alter the dimension of electrodes and channels to control the difference between the variable capacitors Ct_l and Ct_h of the high gray sub-pixel 901 and the low gray sub-pixel 902, thereby obtaining enhanced lateral visibility.

The pixel structure of the liquid crystal panel formed in the liquid crystal display is described above based on the circuit diagram. A signal controller, a data driver, a gate driver, a liquid crystal layer, and the like, which are not described above, may be formed in various manners.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
   a plurality of gate lines;
   a plurality of data lines; and
   a pixel connected to one of the plurality of gate lines and one of the plurality of data lines, the pixel comprising first and second sub-pixels,
   wherein the first sub-pixel comprises:
      a first thin film transistor having control and input terminals connected to at least one of the gate and data lines, respectively; and
      a first liquid crystal capacitor and a first variable capacitor respectively connected to an output terminal of the first thin film transistor, and
   wherein the second sub-pixel comprises:
      a second thin film transistor having control and input terminals connected to at least one of the gate and data lines, respectively; and
      a second liquid crystal capacitor and a second variable capacitor respectively connected to an output terminal of the second thin film transistor,
   wherein the first and second variable capacitors are formed each with a thin film transistor comprising a gate electrode, a semiconductor layer, a source electrode, and a drain electrode, wherein the source and drain electrodes are electrically connected to each other, and
   wherein the source and drain electrodes of the first variable capacitor are respectively connected to the output terminal of the first thin film transistor, and the gate electrode of the second variable capacitor is connected to the output terminal of the second thin film transistor.

2. The display device of claim 1, wherein the first and second variable capacitors have a first capacitance upon receiving a voltage equal to or exceeding a predetermined voltage, and wherein the first capacitance is stored at a region where the semiconductor layer and the source and drain electrodes overlap with the gate electrode.

3. The display device of claim 1, wherein the first and second variable capacitors have a second capacitance upon receiving a voltage that is less than a predetermined voltage, and wherein the second capacitance is stored at a region where the source and drain electrodes overlap with the gate electrode.

4. The display device of claim 1, further comprising an ohmic contact layer formed between the source and drain electrodes and the semiconductor layer.

5. The display device of claim 4, wherein the second capacitance is stored at a region where the ohmic contact layer and the source and drain electrodes overlap with the gate electrode.

6. A display device comprising:
   a plurality of gate lines;
   a plurality of data lines; and
   a pixel connected to one of the plurality of gate lines and one of the plurality of data lines,
   wherein the pixel comprises a thin film transistor with control and input terminals connected to at least one of the gate and data lines, respectively, and a liquid crystal capacitor and a variable capacitor respectively connected to an output terminal of the thin film transistor, wherein the variable capacitor is formed with the thin film transistor;
   wherein the first and second variable capacitors are formed each with a thin film transistor comprising a gate electrode, a semiconductor layer, a source electrode, and a drain electrode, wherein the source and drain electrodes are electrically connected to each other, and
   wherein the source and drain electrodes of the first variable capacitor are respectively connected to the output terminal of the first thin film transistor, and the gate electrode of the second variable capacitor is connected to the output terminal of the second thin film transistor.

* * * * *